（12） United States Patent
Caveney et al.

(10) Patent No.: US 7,841,891 B2
(45) Date of Patent: Nov. 30, 2010

(54) METHOD AND APPARATUS FOR PATCH PANEL PATCH CORD DOCUMENTATION AND REVISION

(75) Inventors: Jack E. Caveney, North Palm Beach, FL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/781,861

(22) Filed: May 18, 2010

(65) Prior Publication Data

US 2010/0221947 A1      Sep. 2, 2010

Related U.S. Application Data

(63) Continuation of application No. 12/422,776, filed on Apr. 13, 2009, now Pat. No. 7,717,734, which is a continuation of application No. 11/925,089, filed on Oct. 26, 2007, now Pat. No. 7,517,243, which is a continuation of application No. 11/265,316, filed on Nov. 2, 2005, now Pat. No. 7,297,018.

(60) Provisional application No. 60/624,753, filed on Nov. 3, 2004.

(51) Int. Cl.
*H01R 3/00*       (2006.01)
(52) U.S. Cl. .................................................... 439/489
(58) Field of Classification Search ......... 439/489–491; 345/82; 702/183; 340/539, 825, 310; 324/578; 385/135
See application file for complete search history.

(56) References Cited

U.S. PATENT DOCUMENTS

| 5,796,376 | A  | * | 8/1998  | Banks ........................ 345/82 |
| 6,002,331 | A  | * | 12/1999 | Laor ....................... 340/539.1 |
| 6,421,322 | B1 | * | 7/2002  | Koziy et al. ................. 370/248 |
| 6,725,177 | B2 | * | 4/2004  | David et al. ................. 702/183 |
| 6,784,802 | B1 | * | 8/2004  | Stanescu ..................... 340/687 |
| 7,027,704 | B2 | * | 4/2006  | Frohlich et al. ............. 385/135 |

\* cited by examiner

*Primary Examiner*—Alexander Gilman
(74) *Attorney, Agent, or Firm*—Robert A. McCann; Zachary J. Smolinski; Christopher K. Marlow (57) ABSTRACT

A method and apparatus are provided for monitoring and reporting cable connectivity such as patch panel port-level connectivity on a real-time basis. For patch panel systems, the approach is based upon a distributed architecture that may be modularly scalable and may reduce, if not eliminate, the need for a centralized signal processor and complex cabling between patch panels and the centralized signal processor. Each patch panel may determine port level connectivity independently. Polling delays and polling-related overhead processing may be reduced or eliminated by supporting real-time monitoring of port connectivity at the port level. The approach provides improved real-time reporting of patch panel connectivity with reduced cabling complexity, increased reliability, and decreased maintenance costs. In addition, the approach is compatible with (i.e., may communicate with and be controlled by) a multipurpose network management system (NMS). In addition, a compatible revision system is provided.

6 Claims, 10 Drawing Sheets

METHOD AND APPARATUS FOR PATCH PANEL PATCH CORD DOCUMENTATION AND REVISION

CROSS-REFERENCE TO RELATED APPLICATION

This application is a continuation of U.S. patent application Ser. No. 12/422,776, filed Apr. 13, 2009, which issued as U.S. Pat. No. 7,717,734 on May 18, 2010, which is a continuation of U.S. patent application Ser. No. 11/925,089, filed Oct. 26, 2007, which issued as U.S. Pat. No. 7,517,243 on Apr. 14, 2009, which is a continuation of U.S. patent application Ser. No. 11/265,316, filed Nov. 2, 2005, which issued as U.S. Pat. No. 7,297,018 on Nov. 20, 2007, which claims the benefit of U.S. Provisional Application No. 60/624,753, filed Nov. 3, 2004. The above-referenced applications are hereby incorporated by reference in their entireties.

BACKGROUND OF THE INVENTION

1. Field of Invention

The present invention pertains to network cable management.

2. Description of Related Art

Communications networks are growing in number and complexity. Monitoring network connections, including the management of patch panel connections, is an important task in network management. There is a desire for a patch panel management architecture that is reliable and scalable.

SUMMARY OF THE INVENTION

A method and apparatus are provided for monitoring and reporting cable connectivity such as patch panel port-level connectivity on a real-time basis. For the patch panel systems example, the approach is based upon a distributed architecture that may be modularly scalable and may reduce, if not eliminate, the need for a centralized signal processor and complex cabling between patch panels and the centralized signal processor. Each patch panel may determine port-level connectivity independently. Polling delays and polling-related overhead processing may be reduced, if not eliminated, by supporting real-time monitoring of port connectivity at the port level. The approach provides improved real-time reporting of patch panel connectivity with reduced cabling complexity, increased reliability, and decreased maintenance costs. In addition, the approach is compatible with (i.e., may communicate with and be controlled by) a multipurpose network management system (NMS).

A method is disclosed for monitoring cable connections (e.g., a patch panel patch cord connection) that may include: transmitting a local patch panel identifier and a local port identifier upon an out-of-band patch cord channel; receiving a remote patch panel identifier and a remote port identifier upon the out-of-band patch cord channel; determining a status of the patch cord connection based upon the received remote patch panel identifier and the received remote port identifier; and transmitting a status update message to a network management system that includes the local patch panel identifier, the local port identifier, the remote patch panel identifier, the remote port identifier, and the status of the patch cord connection.

An apparatus is disclosed for monitoring cable connections (e.g., patch panel patch cord connections) that may include: a transmitter that transmits a local patch panel identifier and a local port identifier upon an out-of-band patch cable channel; a receiver that receives a remote patch panel identifier and a remote port identifier upon the out-of-band patch cable channel; a port controller that determines a status of the patch cord connection based upon the received remote patch panel identifier and the received remote port identifier and generates a port status update upon determining that a change in the status of the patch cord connection has occurred; and a patch panel controller that receives the port status update and transmits an update to a network management system that includes the local patch panel identifier, the local port identifier, the remote patch panel identifier, the remote port identifier, and the status of the patch cord connection.

A program product apparatus is disclosed, having a computer-readable medium with computer program logic recorded thereon for monitoring cable connections (e.g., a patch panel patch cord connection). The program product apparatus may include: a transmitter module that transmits a local patch panel identifier and a local port identifier upon an out-of-band patch cable channel; a receiver module that receives a remote patch panel identifier and a remote port identifier upon the out-of-band patch cable channel; a port controller module that determines a status of the patch cord connection based upon the received remote patch panel identifier and the received remote port identifier and generates a port status update upon determining that a change in the status of the patch cord connection has occurred; and a patch panel controller module that receives the port status update and transmits an update to a network management system that includes the local patch panel identifier, the local port identifier, the remote patch panel identifier, the remote port identifier, and the status of the patch cord connection.

BRIEF DESCRIPTION OF THE DRAWINGS

Exemplary embodiments are described below with reference to the above drawings, in which like reference numerals designate like components.

DETAILED DESCRIPTION OF PREFERRED EMBODIMENTS

The disclosed method and apparatus for monitoring and reporting cable connectivity may be applied to a variety of network devices. For example, as described below, the disclosed method and apparatus may be applied to monitoring and reporting cable connectivity between patch panel systems.

Figure 1:
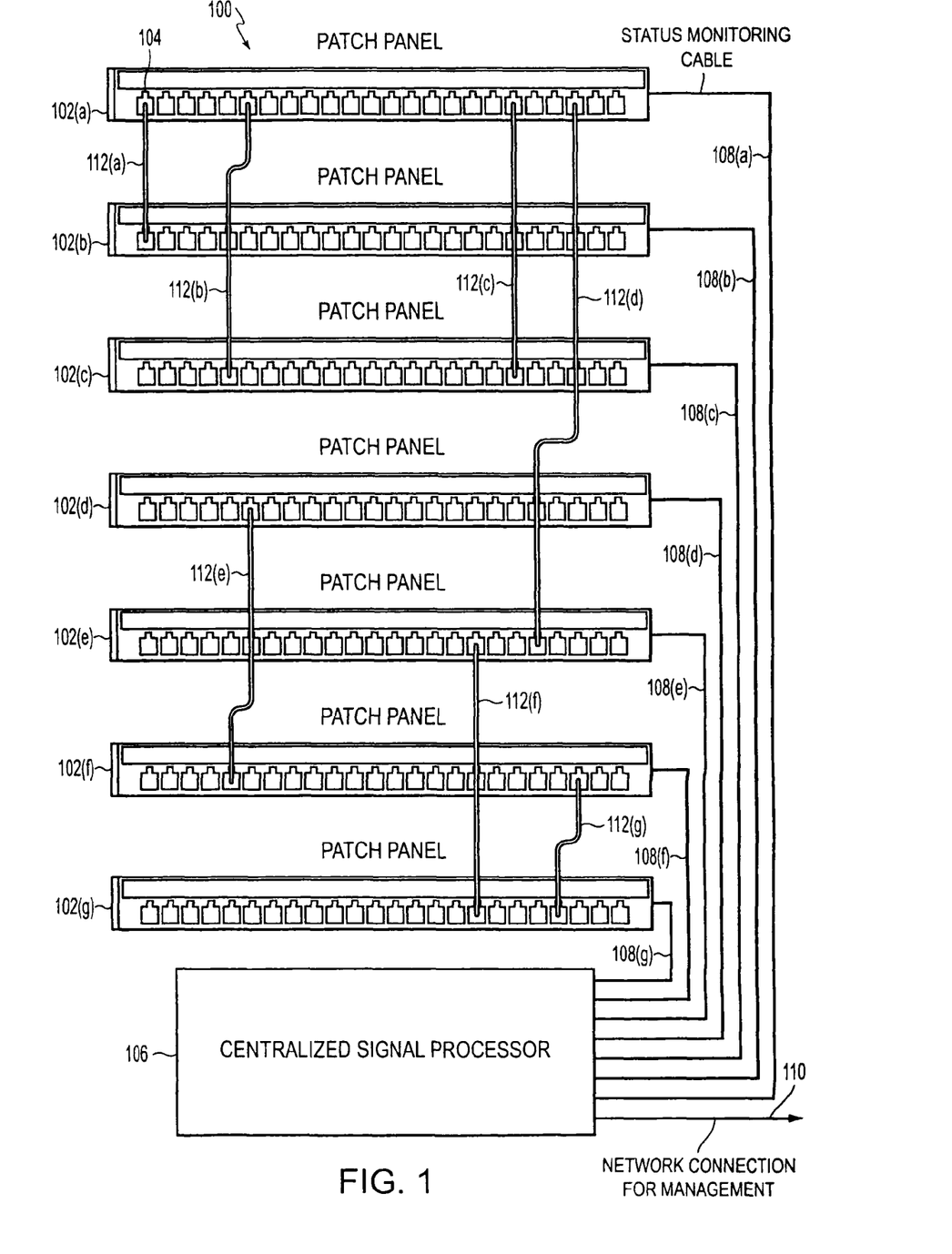
FIG. 1 is a schematic diagram of a single bank of prior art patch panels that uses a centralized signal processor to determine connectivity between patch panel ports using centralized polling techniques.

FIG. 1 presents an example of a prior art patch panel bank 100 in which individual patch panels 102(a-g) have been adapted to support the automated compilation of patch cord connectivity information. As shown in FIG. 1, each patch panel 102 has a plurality of patch panel ports 104 and is connected to a centralized signal processor 106 via a monitoring ribbon cable 108(a-g).

Patch cords 112(a-g) used to establish connectivity between two patch panel ports 104 may include a plurality of network conductors that support network data connections and additional out-of-band conductors that support out-of-band signal connections used by patch panel bank 100 to monitor the connectivity status of the patch cords. For example, an exemplary RJ-45 style cable terminator may include 8 data conductors typically associated with an RJ-45 cable terminator and an additional out-of-band conductor.

Referring again now to FIG. 1, upon insertion of a 9-wire RJ-45 style connector, as described above, into an RJ-45 patch panel port 104, the out-of-band connector makes contact with an out-of-band connector conducting pad (not shown) that is integrated within, or behind, each RJ-45 patch panel port 104. Each out-of-band conducting pad may be connected, internally within the patch panel, to one of the multiple conductors within monitoring ribbon cable 108 that connects each patch panel 102 with centralized signal processor 106. The present invention can make use of a connector having nine or more conductors, or it can use a probe on any type of connector, with the probe making electrical contact with the patch panel motherboard. Such connectors may be used with embodiments of the present invention, including the embodiment of FIG. 2.

In patch panel bank 100, to determine connectivity between individual patch panel ports 104 established by patch cords 112, centralized signal processor 106 polls each port 104 on each patch panel 102 via the respective monitoring ribbon cables 108. For example, centralized signal processor 106 may sequentially place an electrical signal, such as a DC voltage, upon a selected conductor within a selected monitoring ribbon cable 108 and detect whether the signal is received upon another monitoring ribbon cable 108 conductor associated with the same patch panel or another patch panel connected to centralized signal processor 106. If a signal is detected upon a monitoring ribbon cable 108 conductor in response to a signal being placed upon another conductor within the same or a different monitoring ribbon cable 108, centralized signal processor 106 may determine that the two patch panel ports associated with the respective ribbon cable conductors are connected. Centralized signal processor 106 may generate and transmit a message to a Network Management System (NMS) via a management network connection 110 to report the determined port level connectivity. If no signal is detected upon a monitoring ribbon cable 108 conductor in response to a signal being placed upon a conductor within the same or different monitoring ribbon cable 108 associated with a specific patch panel port, centralized signal processor 106 determines that the patch panel port upon which the signal is placed is not in use.

Although a monitored patch panel bank 100, as described above with respect to FIG. 1, is capable of providing a network management system with patch panel connectivity information, such monitored banks of patch panels have significant drawbacks. The approach is not modularly scalable in that the centralized signal processor 106 is limited in the number of physical patch panels to which it can connect and, therefore, is limited in the number of patch panel connections that can be monitored. Although additional centralized signal processors may be obtained to support different banks of patch panels, patch cords connected between patch panels supported by different centralized signal processors cannot be monitored. Further, the monitored patch panel bank 100 based approach makes the centralized signal processor a single point of failure with respect to monitoring the bank of patch panels. Loss of a single centralized signal processor 106 (e.g., due to a loss of power, loss of a network connection, or due to an internal centralized signal processor failure) results in a loss of patch panel monitoring capability for the entire bank of patch panels. Further, the need to connect to a centralized signal processor panel places restraints upon the placement of patch panels and increases cable complexity, thus decreasing reliability and increasing maintenance costs. Still further, increases in the number of panels supported by a single centralized signal processor increases the polling requirements placed upon the centralized signal processor, thus increasing polling cycle time (i.e., the time required to poll all ports on all patch panels) and decreasing responsiveness of the system to changes in patch panel patch cord connectivity.

In view of the above, a patch panel capable of monitoring and reporting patch panel port-level connectivity that is based upon a modularly scalable, distributed architecture is desirable. Such an approach would preferably reduce, if not eliminate, the need for a centralized signal processor by allowing each patch panel to determine port level connectivity independently. Further, such an approach would preferably reduce, if not eliminate, polling delays and polling-related overhead processing by supporting real-time monitoring of port connectivity at the port level. In addition, such an approach would provide real-time reporting of patch panel connectivity with reduced cabling complexity, increased reliability and decreased maintenance costs.

Figure 2:
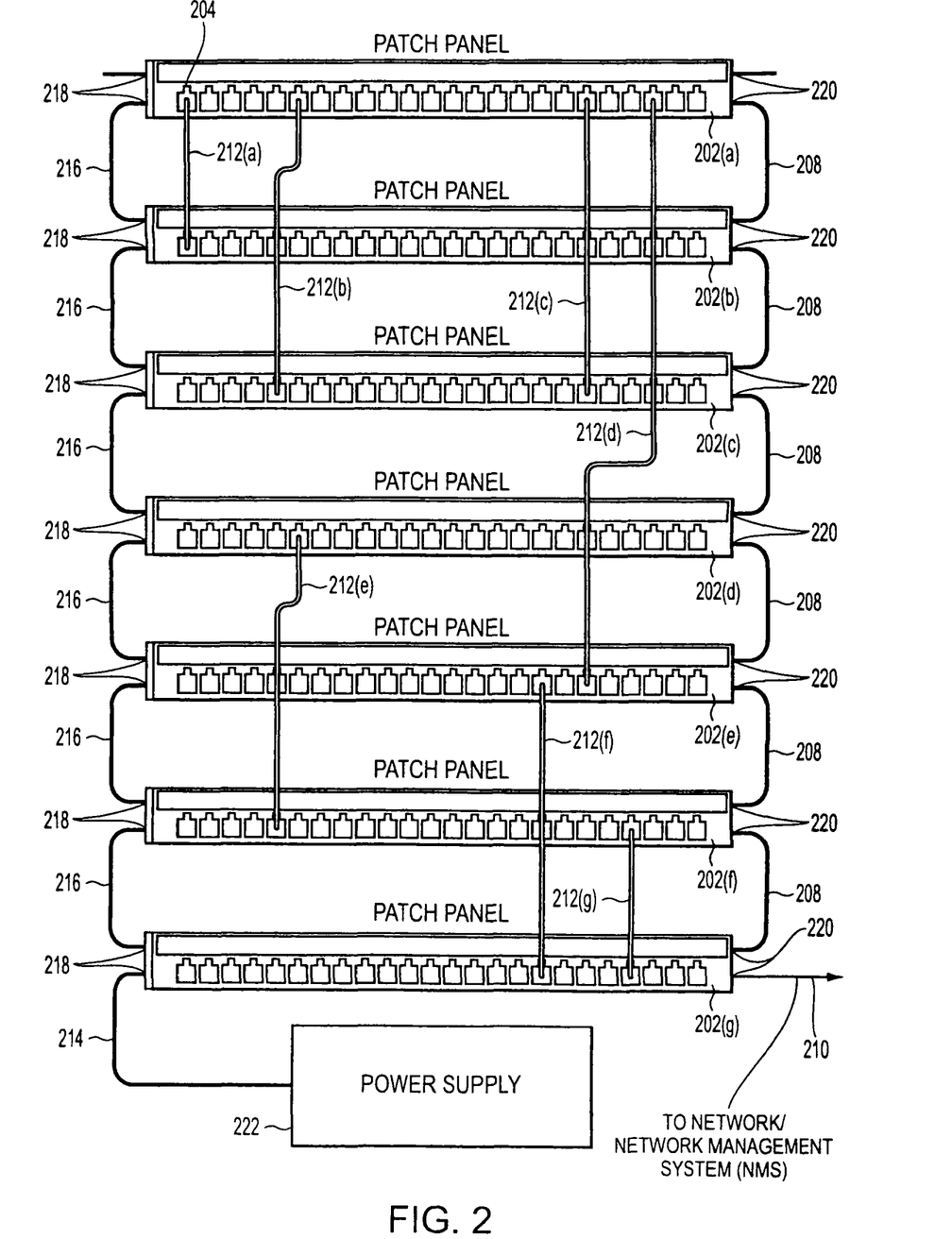
FIG. 2 is a schematic diagram of multiple patch panels, each based upon a modularly scalable, distributed architecture and capable of determining port level connectivity between patch panels.

FIG. 2 is a schematic diagram of seven exemplary modular, intelligent patch panels 202(a-g). Each patch panel 202 is based upon a modularly scalable, distributed architecture. As shown in FIG. 2, each patch panel 202 may include a pair of network connection ports 220 that allow the respective patch panels to be interconnected in a daisy-chain configuration to a network connection 210 using daisy-chain network cables 208 (e.g., relatively short spans of 4-pair network cable terminated in conventional RJ-45 terminators). Network connection 210 may provide network connectivity to each patch panel in the daisy-chain and may thereby provide each patch panel in the daisy-chain with connectivity to a remote Network Management System (NMS). Further, each patch panel 202 may include a pair of power sharing ports 218 that allow the patch panels to be interconnected in a daisy-chain configuration to a single power supply 222 using daisy-chain power cables 216 (e.g., relatively short spans of DC or AC electrical power cabling with appropriate connectors).

Each patch panel 202 is capable of monitoring and reporting patch panel port level connections formed by patch cords manually connected between ports on one or more patch panel devices without support from a centralized signal processor (e.g., as described with respect to FIG. 1 block 106).

Therefore, the patch panel may reduce or eliminate the need for status-monitoring ribbon cables (as described with respect to FIG. 1). The ability to daisy-chain power to multiple patch panels from a single power supply 222 may reduce or eliminate the need for independent power supplies to each individual patch panel and further reduces the volume of power-related cables. The ability to daisy-chain network connectivity to multiple patch panels from a network connection 210 may reduce or eliminate the need for independent network cables for each individual patch panel and further reduces the volume of network-related cables.

The patch panel architecture allows network patch panel capabilities to be scaled in any manner by the introduction of any number of patch panel devices. The patch panel architecture allows patch cord connectivity between any two patch panel ports to be determined based upon out-of-band communication between the respective connected ports over an out-of-band patch cord connection. The patch panel may reduce or eliminate the need for a common centralized signal processor to determine connectivity between patch panel ports. Further, elimination of the need for a centralized signal processor may remove a single point of failure with respect to the ability to monitor a set of patch panels and may remove or eliminate multiple other potential points of failure via simplified cabling. Further, unlike the polling approach described above with respect to FIG. 1, the patch panel architecture supports the monitoring and the reporting of changes in patch panel port-level connectivity on a real-time basis, regardless of the number of patch panels included in the network. Response time does not increase with the number of patch panels added to a network, as is the case with systems that rely upon a centralized signal processor to sequentially scan each port on each of the respective patch panels that the centralized signal processor supports. The patch panel architecture according to some embodiments of the present invention supports patch panel monitoring that may be modularly scaled to support any size network, provides real-time monitoring with reduced delay, and employs a simplified inter-patch-panel cabling scheme that increases reliability and reduces maintenance costs.

Figure 3:
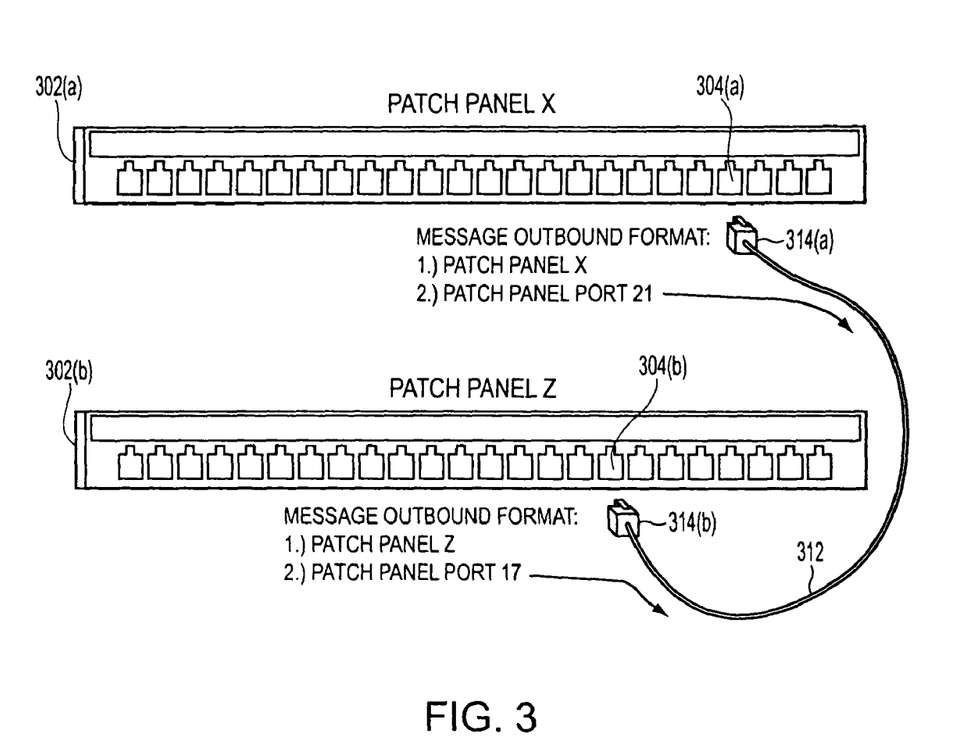
FIG. 3 is a schematic diagram depicting messaging exchanged between two patch panels.

FIG. 3 is a schematic diagram depicting an exchange of out-of-band messages between a patch panel 302(a) labeled "patch panel X" and a patch panel 302(b) labeled "patch panel Z." As described in greater detail below, each patch panel port may repeatedly broadcast over the out-of-band channel a port message identifying the patch panel and port generating the message. For example, as shown in FIG. 3, patch panel port 304(a) associated with panel X may generate an outbound message "patch panel X/Port 21" to indicate that patch panel port 304(a) is the twenty-first port on patch panel X. Further, as shown in FIG. 3, port 304(b) associated with patch panel Z may generate an outbound message "patch panel Z/Port 17" to indicate that patch panel port 304(b) is the seventeenth port on patch panel Z.

Each patch panel port may repeatedly broadcast an outbound message and listen for receipt of an outbound message generated from another patch panel port. Until a patch cord that supports the out-of-band communication channel is connected between two patch panel ports, neither port will receive an out-of-band message. However, upon connection of two patch panel ports with a patch cord that supports an out-of-band communication channel (e.g., a patch cord with a $9^{th}$ wire) each patch panel port may receive the outbound message broadcast by the patch panel port with which it has established connectivity. The patch panel port controller associated with each of the respective ports may then generate, in real time, an update message to its respective patch panel controller. Upon receipt of an update message from a port controller, each respective patch panel controller may generate and transmit an update message over a network connection to a remote NMS that is configured to organize and present the received physical topology information in a manner useful to an end user.

Figure 4:
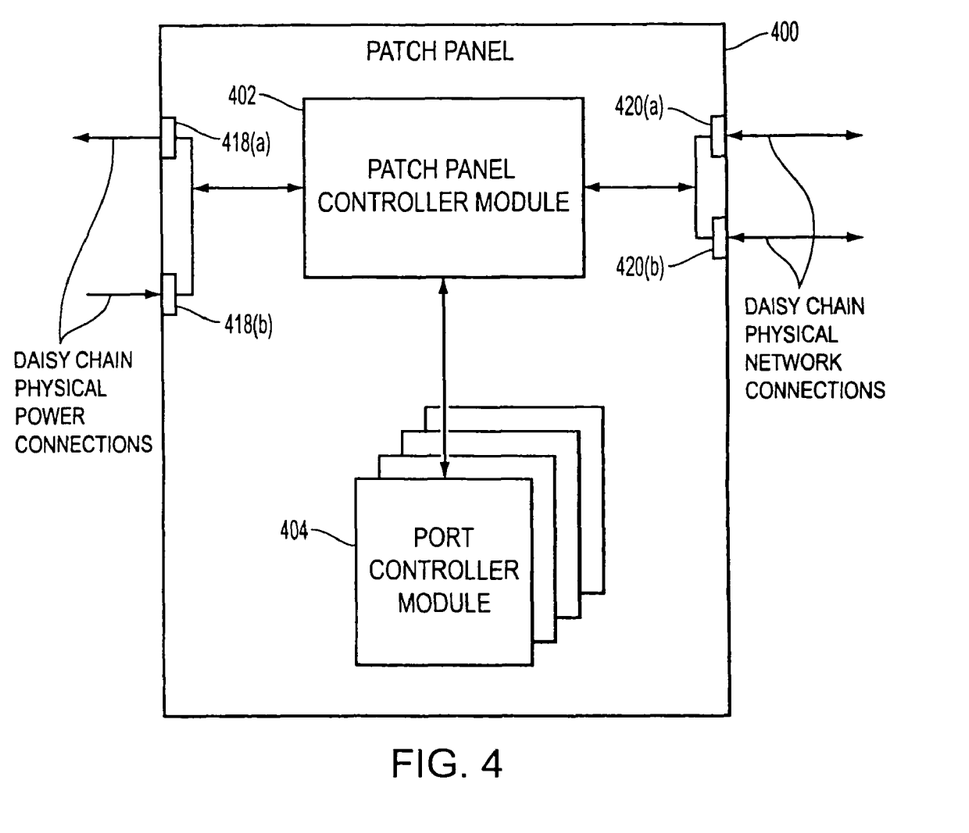
FIG. 4 is a block diagram of an exemplary patch panel depicted in FIGS. 2 and 3.

FIG. 4 is a block level diagram of an exemplary patch panel configuration. As shown in FIG. 4, patch panel 400 includes a panel controller module 402 that communicates with a plurality of port controller modules 404. Further, the patch panel controller module 402 may support communication with another patch panel and/or a network management system via daisy-chain network connection ports 420(a) and 420(b), as described above. In addition, the patch panel may receive electrical power from a power supply or another patch panel and may transfer power to another patch panel via daisy-chain power connection ports 418(a) and 418(b), as described above.

Figure 5:
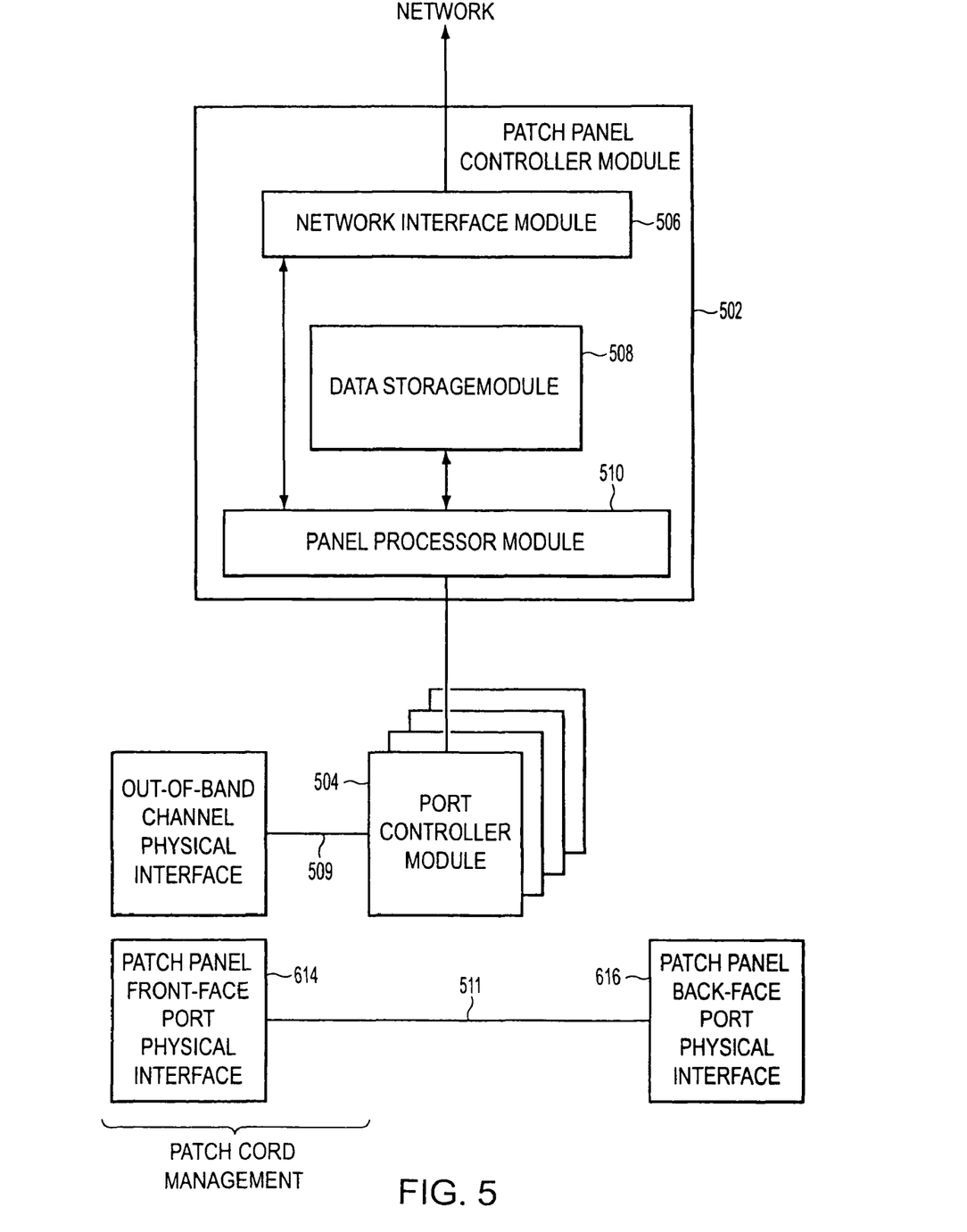
FIG. 5 is a block diagram of an exemplary panel controller module as depicted in FIG. 4.

FIG. 5 is a block diagram of an exemplary patch panel controller module 502. As shown in FIG. 5, panel controller module 502 may include a panel processor module 510 in communication with a data storage module 508, a network interface module 506 and a plurality of port controller modules 504.

Panel processor module 510 may communicate with each of the respective port controller modules 504 to receive port status updates. Upon receipt of an update message from a port controller module 504, panel processor module 510 may update status information stored within data storage module 508, generate an SNMP compliant update message that includes connection related information received from the port controller module, and transmit the generated SNMP compliant update message to a remote network-connected NMS via network interface module 506. A ninth wire connection 509 or other probe connection is connected to the patch panel out-of-band channel physical interface and the port controller module 504. The in-band communications, carried in the embodiment of FIG. 5 through eight conductors 511, proceed through the patch panel without modification.

Panel processor module 510 may receive and process SNMP messages from the remote network connected NMS via network interface module 506. The SNMP message may contain updated configuration parameters for use in controlling the panel controller module 502 and/or one or more of port controller modules 504. Upon receipt of an update message from a remote network-connected NMS, panel processor module 510 may update status information stored within data storage module 508 and generate/transmit an internal update message to each of the respective port controller modules 504.

Although not indicated in FIG. 5, panel processor module 510 may include additional functionality or modules for use in controlling the behavior and operation of the patch panel. Such additional modules may store and/or update within data storage module 508 managed objects associated with the additional functions performed. Preferably, such objects are stored in a structure and format compatible with a defined SNMP Management Information Base (MIB) to facilitate SNMP-based reporting (e.g., via an SNMP get-response message and/or via an SNMP event trap message, etc.) of the stored values from the panel processor module 510 to the NMS and/or to support updates from the NMS to patch panel controller module 502 via SNMP based messages (e.g., via the SNMP set command). An additional function that may be included in panel processor module 510 supports the receipt and processing of command, control and reporting instructions from the NMS via protocols other than SNMP.

Different panel controller module 502 configurations may include a panel processor module 510 with capabilities that range from nominal functions to sophisticated monitoring and control functions. As such, the hardware/software modules required to implement panel controller module 502 may range from relatively simple modules with limited storage and processing capabilities to relatively complex modules with significant storage and processing capabilities.

Figure 6:
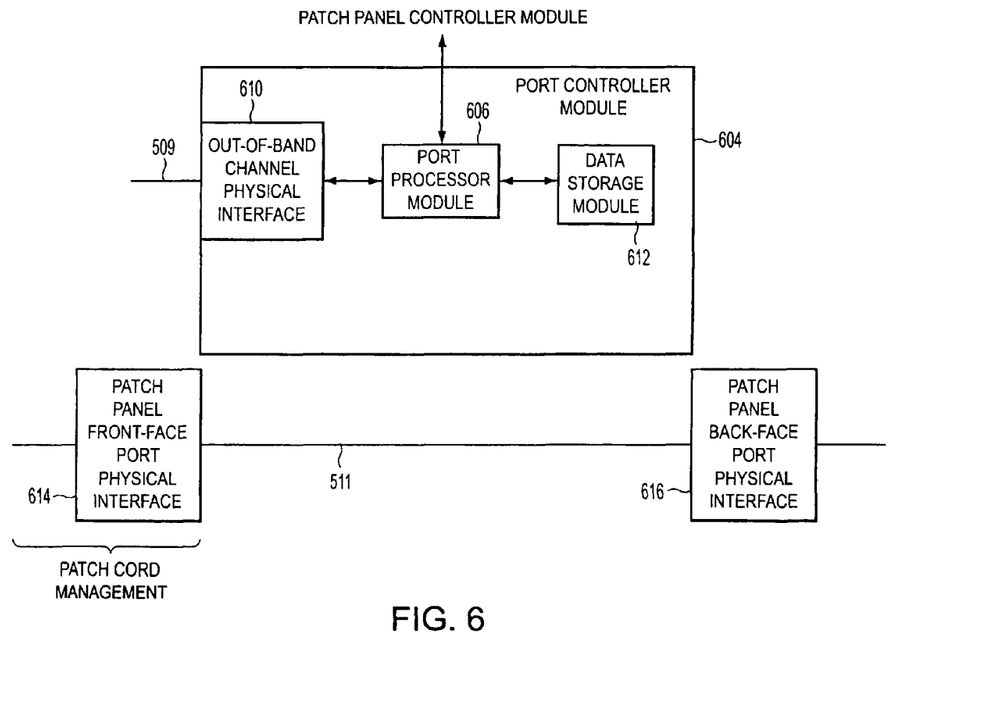
FIG. 6 is a block diagram of an exemplary port controller module as depicted in FIG. 5.

FIG. 6 is a block diagram of an exemplary port controller module 604. As shown in FIG. 6, port controller module 604 may include a port processor module 606 in communication with a data storage module 612. Port processor module 606 communicates with an out-of-band channel physical interface 610.

Port processor module 606 may communicate with the patch panel controller module to send port update messages to the panel controller module and to receive configuration/control parameter updates from the panel controller module. Upon receipt of an update message from the panel controller module, port processor module 606 may update status information stored within data storage module 612. Port processor module 606 may use parameters received from the patch panel controller module and stored in data storage module 612 to control operation of port controller module 604 and to control events reported via update messages to the panel controller module.

In one exemplary port controller module, port processor module 606 may retrieve from data storage module 612 a local patch panel identifier, a local port identifier, and a local port connection status associated with the current, or local, port controller module (e.g., patch panel/port information related to the current, or local, patch panel port) and may provide the retrieved information to out-of-band channel physical interface 610, generating an outbound port message that includes the retrieved local patch panel identifier and local port identifier information. The port processor module 606 may proceed to transmit the message upon the out-of-band channel via a transmitter, which in one embodiment is operated by out-of-band channel physical interface 610. Further, the port processor module 606 may receive an inbound message from a remote port that includes a remote patch panel identifier and remote port identifier information, via a receiver which may be operated by out-of-band channel physical interface 610.

In an exemplary configuration in which out-of-band channel physical interface 610 supports a single out-of-band conductor, the port processor module 606 may repeatedly alternate between transmitting an outbound port message and checking to see if an outbound message from a remote port may be received. In another exemplary configuration in which the out-of-band channel physical interface 610 supports two separate out-of-band conductors, the port processor module 606 may simultaneously transmit an out-of-band outbound port message and check for/receive an out-of-band message from a remote port, simultaneously.

The terms "remote port" and "local port" are relative terms. For example, from the perspective of a patch panel port controller, the term "remote port" may be used to refer to any port other than the "local port" supported by that patch panel port controller. Given that a patch panel supports multiple ports, a "remote port" may be a port on the same, or local, patch panel as a "local port" or the "remote port" may be a port on another, or remote, patch panel. A remote port and a local port behave, and are, exactly the same except that each has a relative position with respect to the other. For example, each port, based upon the perspective of that port, transmits an out-of-band outbound port message that includes a local patch panel identifier and a local port identifier. Further, each port, based upon the perspective of that port, receives a remote patch panel identifier and a remote port identifier within a received message.

Upon determining, based upon the monitored out-of-band messages, that a change in port level connectivity has occurred, port processor module 606 may store the updated status information in data storage module 612 and send an update message to the panel controller module, as described above with respect to FIG. 5.

As described above, different port controller module 604 configurations may include a port processor module 606 with capabilities that range from nominal functions to sophisticated functions. As such, the hardware/software modules required to implement port controller module 604 may range from relatively simple modules with relatively slight storage and processing capabilities to relatively complex modules with relatively significant storage and processing capabilities.

Figure 7:
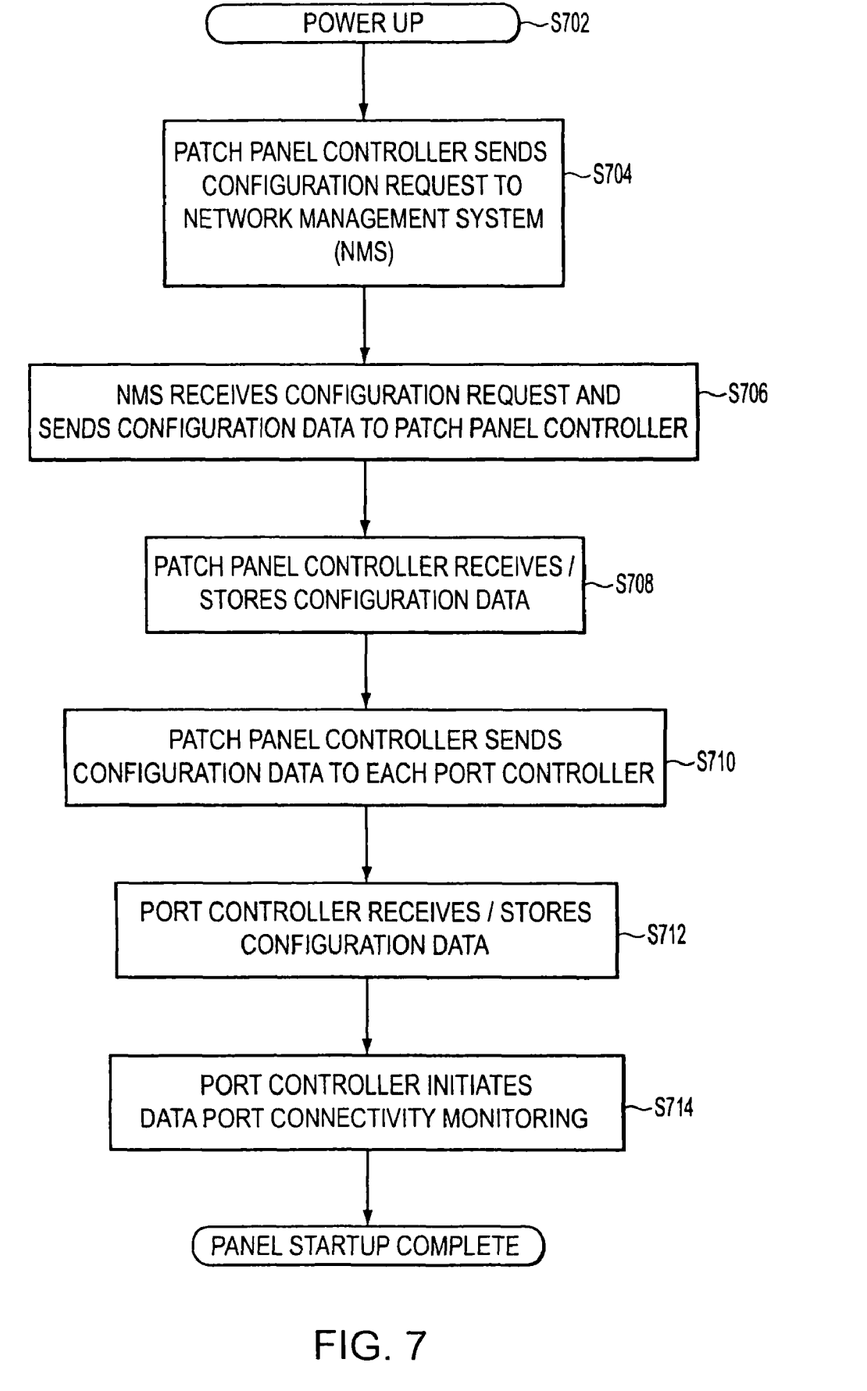
FIG. 7 is an exemplary flow chart of the workflow associated with startup of an exemplary patch panel.

FIG. 7 is a flow chart of an exemplary workflow associated with the startup of an exemplary patch panel device. As shown in FIG. 7, upon powering up, at step S702, of a patch panel device, the patch panel panel controller may send, at step S704, a configuration request to a remote NMS. Upon receipt, at step S706, by the NMS of the configuration request, the NMS may retrieve, from a configuration controlled storage repository, configuration parameters for the patch panel device from which the configuration request was received and send the retrieved configuration parameters to the patch panel panel controller. Upon receipt, at step S708, of the requested configuration parameters, the patch panel panel controller may store the received parameters and send, at step S710, all or a portion of the received configuration parameters to each of the respective patch panel port controllers associated with each of the respective patch panel ports to which all or portions of the respective configuration parameters apply. Upon receipt, at step S712, of configuration data from the panel controller, each port controller may store the configuration parameters and may initiate, at step 714, port connectivity monitoring in accordance with the received control parameters, as described above.

Figure 8:
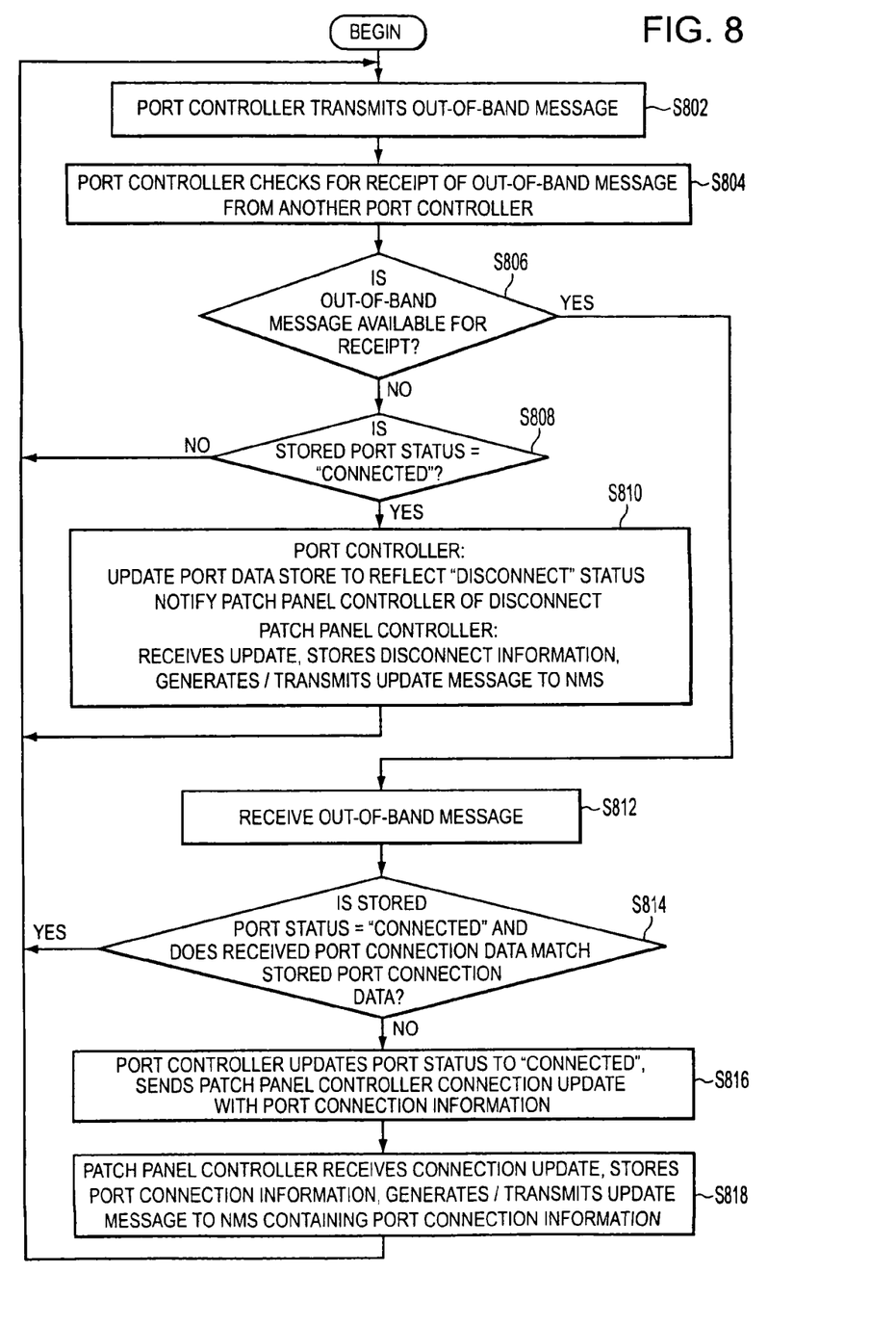
FIG. 8 is an exemplary flow chart of the workflow associated with operation of an exemplary patch panel to monitor and report patch panel port level connectivity information.

FIG. 8 is a flow chart of an exemplary workflow associated with monitoring patch panel port-level connectivity based the monitoring of communications upon an out-of-band communication channel, as described above. As shown in FIG. 8, upon initiation of patch cord connectivity monitoring, a patch panel port controller may transmit, at step S802, an outbound message upon the out-of-band channel associated with the monitored port. Such an outbound message may contain patch panel/port information associated with the monitored patch panel port.

Next, the port controller may check, at step S804, to determine whether an out-of-band message from another patch panel port controller is available for receipt. If the port controller determines, at step S806, that an out-of-band message is not available for receipt, the port controller checks, at step S808, the currently stored port status. If the port controller determines that the stored connection status indicates that the port is not connected, the process flow proceeds to S802 to again transmit an out-of-band channel outbound message containing patch panel/port information associated with the monitored patch panel port. If the port controller determines, at step S808, that the stored connection status indicates that the port status is "connected," the port controller may update, at step S810, a port-level data store to reflect the new port status as "disconnected" and may generate and send to the patch panel controller a message notifying the panel controller of the disconnect. Upon receipt of the message from the port controller containing a new port status, the panel controller may store the port status information in a panel level information store and generate/transmit a status update to the NMS via the network. The process flow may then proceed to step S802.

If the port controller determines, at step S806, that an out-of-band message is available for receipt, the port controller receives, at step S812, the out-of-band message. If the port controller determines, at step S814, that the port status is "connected" and that the received patch panel/port information matches previously stored patch panel/port information, no update to the panel controller is generated and processing may proceed to step S802.

However, if the port controller determines, at step S814, that the stored port status is "disconnected" and/or that the received patch panel/port information does not match previously stored patch panel/port information, the port controller may conclude that a change in port connectivity status has occurred. Therefore, at step S816, the port controller may update the port level data store to reflect a port status of "connected" and may send a message to the panel controller containing the new port status and the newly received patch panel/port connection information. The panel controller receives, at step S818, the update message and in response may update the panel-level information store to reflect the received connection status and port connectivity information and may generate and transmit an update message via the network to the NMS. The process flow may then proceed to step S802.

Figure 9:
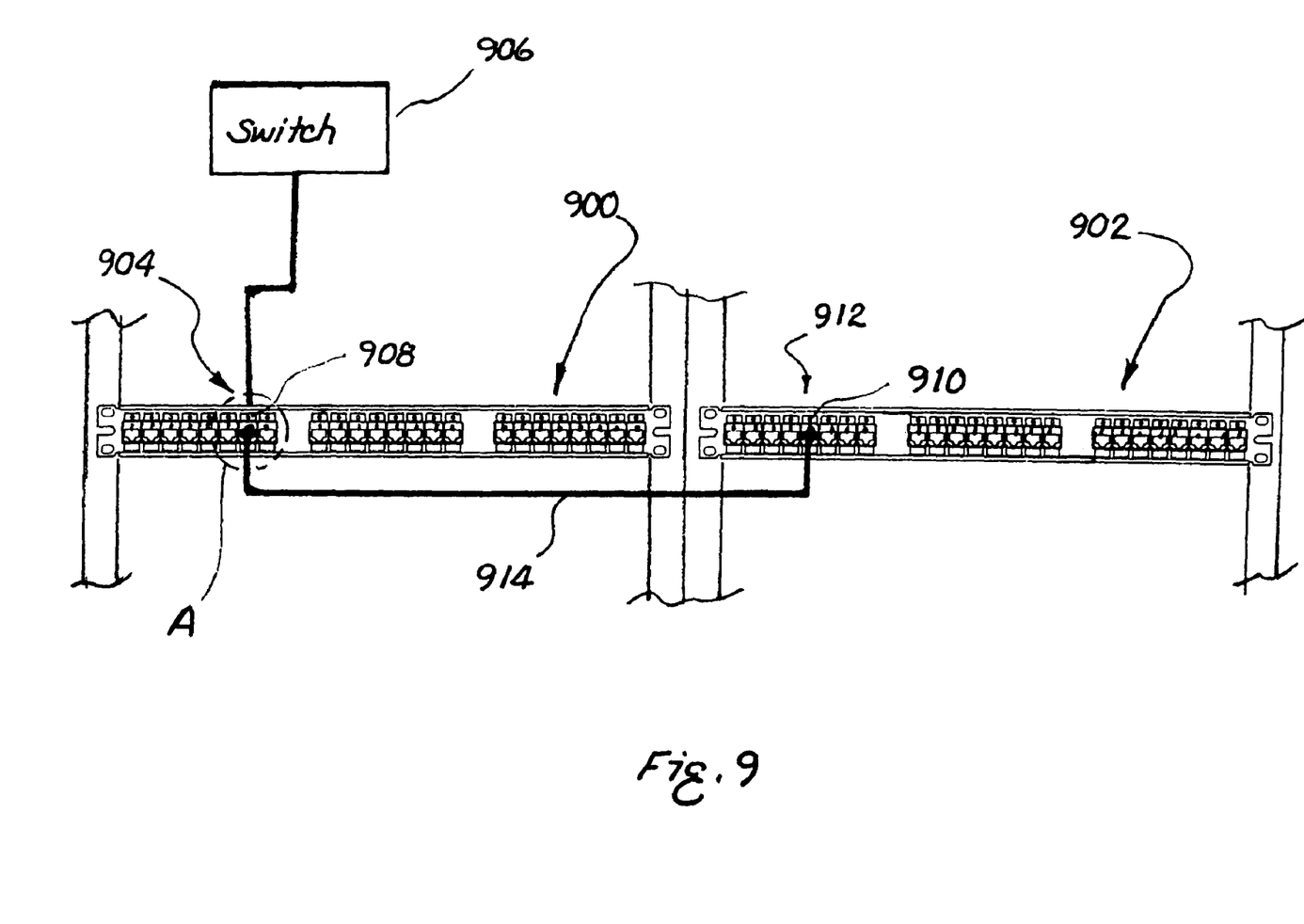
FIG. 9 is a block diagram of two patch panels for use with a revision system according to one embodiment of the present invention.

FIG. 9 shows one embodiment of the present invention which is used for cross-connect systems wherein all patch cords are connected between patch panels in group 1 (group 1 ports) and patch panels in group 2 (group 2 ports). In this embodiment, there is a MAC chip associated with each port of each patch panel. Each system transmission on a $9^{th}$ wire is from a group 1 port to a group 2 port. Each group 1 port continuously sends its MAC ID over its $9^{th}$ wire. If such a signal is received at a group 2 port, the IDs of both the group 1 port and the group 2 port are sent to the NMS by the group 2 port. When receipt by the NMS is acknowledged, the group 2 port stops sending the message. If a group 2 port stops receiving the MAC ID signal from the group 1 port, it transmits its ID continuously to the NMS until receipt is acknowledged by the NMS. The NMS is therefore continuously updated. This documentation system does not require a data storage module in each patch panel. A central revision system which is a subsystem of the NMS also controls an LED associated with each port. The transmissions to each patch panel to control the LED's are on the same Ethernet system used for the documentation system.

Turning again to FIG. 9, a revision system is illustrated using a first patch panel 900 and a second patch panel 902 according to the present invention. A port 904 on the first patch panel 900 is connected upstream to a network switch 906. The revision system is a sub-system in the network management system (NMS). The revision system can guide the removal or the addition of a patch cord. Each patch panel port is provided with an LED.

To guide the removal of a patch cord, the revision system causes a first LED 908 of the first port 904 and a second LED 910 of a second port 912, to which the patch cord 914 is attached, to flash. In the embodiment of FIG. 9, the patch cord 914 is a nine-wire patch cord. The revision system next causes MAC ID's of the first port 904 and the second port 912 to be sequentially and continuously sent to the revision system by port 912. A reviser unplugs the patch cord 914 from the second port 912, which is associated with the flashing LED 910. The revision system next causes only the MAC ID of the second port 912 to be continuously sent to the revision system until it receives the message. The revision system then turns off the LED 910 of the second port 912 and, after a time delay, also turns off the LED 908 of the first port 904.

To guide the addition of a patch cord, the revision system lights both the first LED 908 and the second LED 910. When the patch cord connecting the first and second ports 904 and 912 is installed, both ID's are sent sequentially and continuously by port 912 to the revision system until the revision system receives the message and turns off both LED's.

Figure 10:
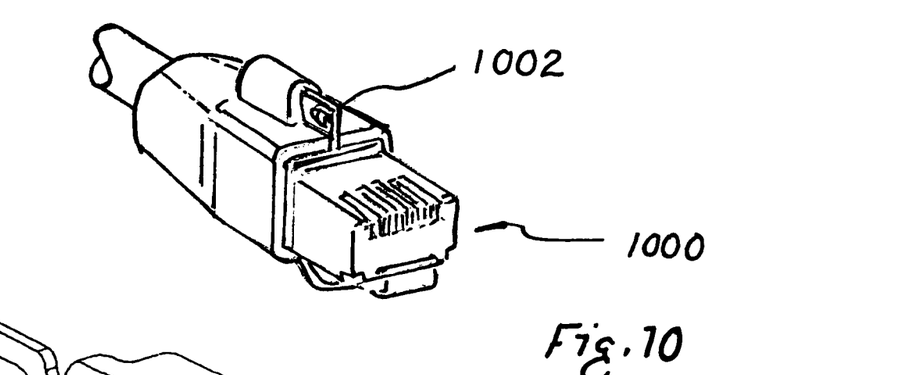
FIG. 10 is a perspective diagram of a plug according to one embodiment of the present invention.
Figure 11:
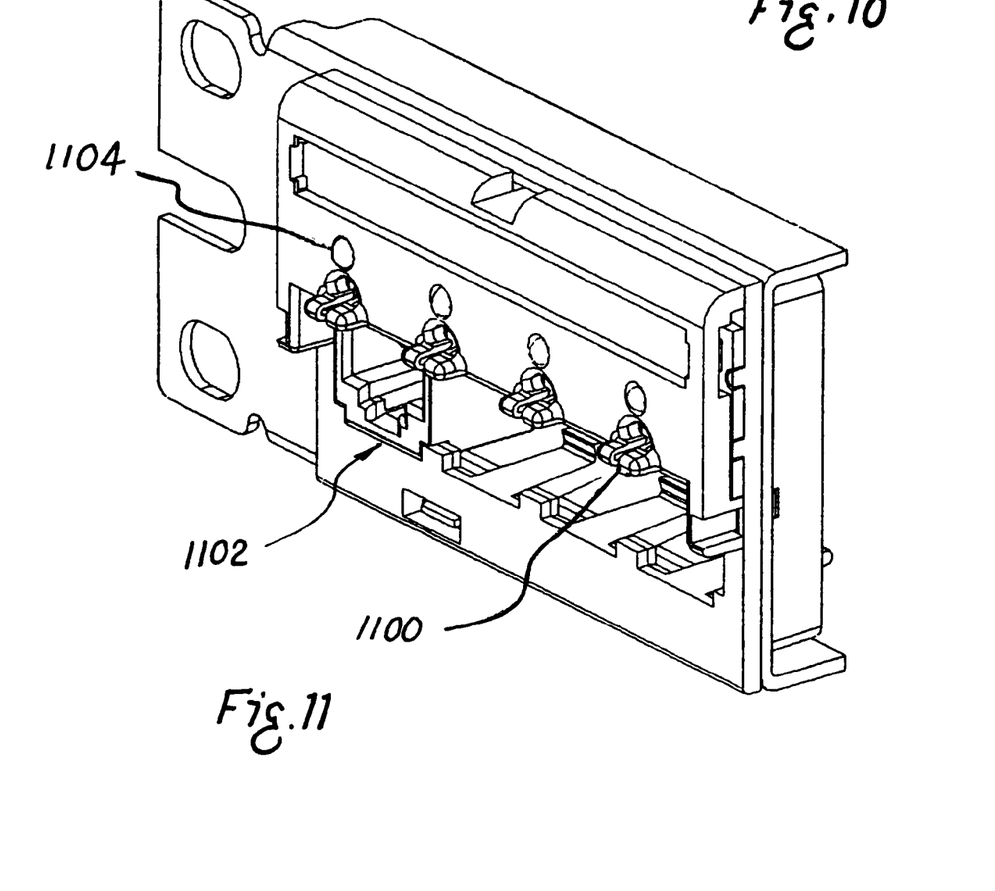
FIG. 11 is a perspective drawing of a portion of a patch panel according to one embodiment of the present invention.

FIGS. 10 and 11 illustrate a plug and a number of jacks as shown by the circle "A" of FIG. 9. FIG. 10 shows a plug 1000 having a contact 1002 at the top. The contact 1002 is electrically connected to the ninth wire of the plug's patch cord, and is designed to mate with ninth-wire receptacles 1100 as shown in FIG. 11 when the plug is inserted into a jack 1102. Also shown in FIG. 11 are LED's 1104 associated with each of the jacks. Plugs and jacks as shown in FIGS. 10 and 11 may be used in other embodiments of the present invention.

It will be appreciated that the exemplary embodiments described above and illustrated in the drawings represent only a few of the many ways of implementing patch panels according to the present invention for use in managing network patch panel connections. The present invention is not limited to use within any specific network cable infrastructure configuration disclosed herein, but may be applied to any deployed network infrastructure that may benefit from the use of patch panels. Further, the automated cable management capability described may be integrated within any network connected device, including but not limited to a switch, a router, a computer, a server, a network connected data repository, an end-user device such as a printer, a workstation, and a hand-held computing device.

The patch panel may be implemented in any number of hardware and software modules and is not limited to any specific hardware/software module architecture. Each patch panel module may be implemented in any number of ways and is not limited in implementation to execute process flows precisely as described above. The patch panel patch cord connection monitoring process described above and illustrated in the flow charts and diagrams may be modified in any manner that accomplishes the functions described herein.

It is to be understood that various functions of the patch panel patch cord management methods and apparatus may be distributed in any manner among any quantity (e.g., one or more) of hardware and/or software modules or units, computer or processing systems or circuitry.

A patch panel that supports the patch cord connection monitoring process may support patching of any type of network cabling, including but not limited to copper and/or optical fiber cabling. Port connections on the face plate of a patch panel and/or a patch panel network connection port may support any type of cable and cable connector, including but not limited to RJ-45 based connectors and optical fiber connectors. Port connections on the rear plate of a patch panel may support any type of cable and cable connector, including but not limited to punch-down ports, RJ-45 ports, optical fiber connections, etc.

Patch panel network connectivity is not limited to the use of daisy-chain network connectivity between patch panel devices. Individual patch panel devices may connect to a network through any type of network connection, either directly or via an indirect, or shared, connection.

Patch panel power connectivity is not limited to the use of a daisy-chain power connection between patch panel devices.

Individual patch panel devices may connect directly to a dedicated power source or a shared power source, either directly or via an indirect connection.

Network Management System processes associated with the patch panel patch cord connection monitoring processes may be integrated within a stand-alone system or may execute separately and be coupled to any number of devices, workstation computers, server computers or data storage devices via any communication medium (e.g., network, modem, direct connection, etc.). The Network Management System processes associated with the patch panel patch cord connection monitoring process can be implemented by any quantity of devices and/or any quantity of personal or other type of computers or processing systems (e.g., IBM-compatible, Apple, Macintosh, laptop, palm pilot, microprocessor, etc.). The computer system may include any commercially available operating system (e.g., Windows, OS/2, Unix, Linux, DOS, etc.), any commercially available and/or custom software (e.g., communication software, traffic analysis software, etc.) and any types of input/output devices (e.g., keyboard, mouse, probes, I/O port, etc.).

The patch panel and Network Management System software associated with the patch panel patch cord connection monitoring process may be implemented in any desired computer language, and could be developed by one of ordinary skill in the computer and/or programming arts based on the functional description contained herein and the flow charts illustrated in the drawings. For example, in one exemplary embodiment the patch panel patch cord connection monitoring process may be written using the C++ programming language, however, the present invention is not limited to being implemented in any specific programming language. The various modules and data sets may be stored in any quantity or types of file, data or database structures. Moreover, the software associated with the patch panel patch cord connection monitoring process may be distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The format and structure of internal information structures used to hold intermediate information in support of the patch panel patch cord connection monitoring process, and network cable management with respect to devices other than the patch panel, may include any and all structures and fields and are not limited to files, arrays, matrices, status and control booleans/variables.

The Network Management System used to support the patch panel patch cord connection monitoring process software may be installed and executed on a computer system in any conventional or other manner (e.g., an install program, copying files, entering an execute command, etc.). The functions associated with the Network Management System may be performed on any quantity of computers or other processing systems. Further, the specific functions may be assigned to one or more of the computer systems in any desired fashion.

The patch panel patch cord connection monitoring process may accommodate any quantity and any type of data set files and/or databases or other structures containing stored data sets, measured data sets and/or residual data sets in any desired format (e.g., ASCII, plain text, any word processor or other application format, etc.).

Patch panel patch cord connection monitoring process output may be presented to the user (e.g., via the Network Management System) in any manner using alphanumeric and/or visual presentation formats. Patch panel connection data may be presented in either alphanumeric or visual form and can be processed by the NMS in any manner and/or using any number of threshold values and/or rule sets.

Further, any references herein to software performing various functions generally refer to computer systems or processors performing those functions under software control. The computer system may alternatively be implemented by hardware or other processing circuitry. The various functions of the patch panel patch cord connection monitoring process may be distributed in any manner among any quantity (e.g., one or more) of hardware and/or software modules or units, computers or processing systems or circuitry. The computer or processing systems may be disposed locally or remotely of each other and communicate via any suitable communication medium (e.g., LAN, WAN, Intranet, Internet, hardwire, modem connection, wireless, etc.). The software and/or processes described above and illustrated in the flow charts and diagrams may be modified in any manner that accomplishes the functions described herein.

From the foregoing description it will be appreciated that an intelligent patch panel and method of managing network patch panel connections using a patch panel architecture are disclosed that are capable of accurately assessing, and reporting in real-time, deployed patch panel patch cord connectivity information.

While a patch panel and method of managing network patch panel connections using a patch panel architecture are disclosed, any modifications, variations and changes within the skill of one of ordinary skill in the art fall within the scope of the present invention. Although specific terms are employed herein, they are used in their ordinary and accustomed manner only, unless expressly defined differently herein, and not for purposes of limitation.

What is claimed is:

1. A method of monitoring and reporting patch panel port-level connectivity information to a network management system comprising:

providing a first patch panel having a plurality of first patch panel ports and a first port controller and a second patch panel having a plurality of second patch panel ports and a second port controller, at least one of said first patch panel ports being connected to at least one of said second patch panel ports via an in-band communication channel and an out-of-band communication channel;

transmitting, from said first port controller, an outbound message along said out-of-band communication channel of one of said first patch panel ports, said outbound message containing patch panel and port information associated with said port; and checking at said first port controller to determine whether an out-of-band message from said second port controller is available for receipt.

2. The method of claim 1, further comprising checking a currently stored port status if no out-of-band message from said second port controller is available for receipt.

3. The method of claim 2, further comprising re-transmitting, from said first port controller, said outbound message along said out-of-band communication channel, if said currently stored port status indicates that said one of said first patch panel ports is not connected to another port.

4. The method of claim 2, further comprising updating a port-level data store to show that said one of said first patch panel ports is disconnected, if said currently stored port status indicates that said one of said first patch panel ports is connected to another port.

5. The method of claim 1, further comprising receiving said out-of-band message from said second port controller if said out-of-band message is available for receipt.

6. The method of claim 5, further comprising updating a port-level data store to show the connection status of said one of said first patch panel ports if information from said out-of-band message differs from connection information in said port-level data store.

* * * * *